Sept. 20, 1949.  J. B. ADAMS, JR  2,482,451
PIEZOELECTRIC CRYSTAL HOLDER
Filed June 7, 1945  3 Sheets-Sheet 1

INVENTOR.
James B. Adams, Jr.
BY
John H Hanrahan

Sept. 20, 1949.   J. B. ADAMS, JR   2,482,451
PIEZOELECTRIC CRYSTAL HOLDER
Filed June 7, 1945   3 Sheets-Sheet 2
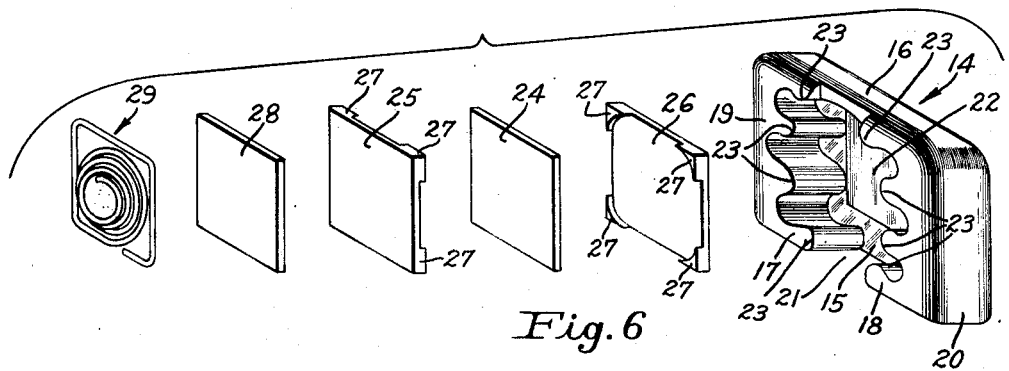
Fig. 6
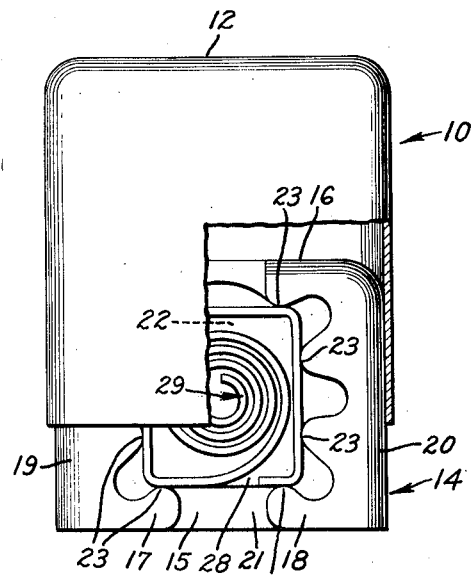
Fig. 7
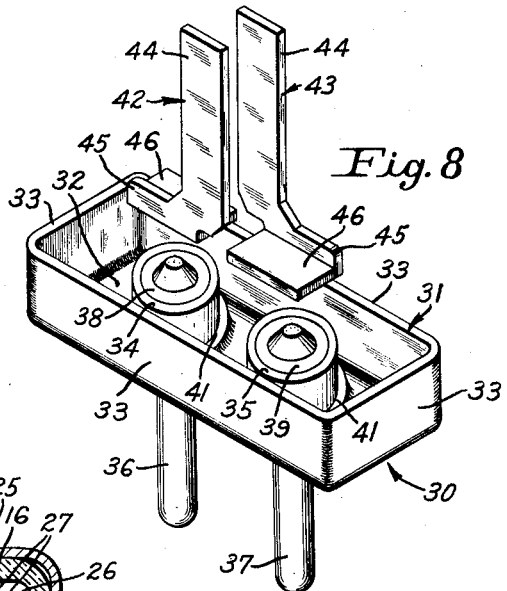
Fig. 8
Fig. 14
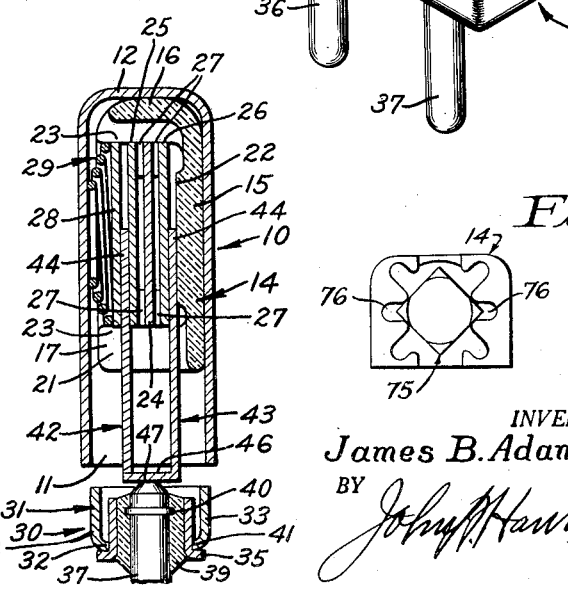
Fig. 9
INVENTOR.
James B. Adams, Jr.
BY Sept. 20, 1949. J. B. ADAMS, JR 2,482,451
PIEZOELECTRIC CRYSTAL HOLDER Filed June 7, 1945 3 Sheets-Sheet 3

INVENTOR.
James B. Adams, Jr.
BY

Patented Sept. 20, 1949

2,482,451

UNITED STATES PATENT OFFICE 2,482,451

PIEZOELECTRIC CRYSTAL HOLDER

James B. Adams, Jr., Baltimore, Md., assignor, by mesne assignments, to Reeves Hoffman Corporation, Carlisle, Pa., a corporation of Pennsylvania Application June 7, 1945, Serial No. 598,071

4 Claims. (Cl. 171—327)

This invention relates to new and useful improvements in piezo-electric devices and has particular relation to an improved holder for such devices.

The objects and advantages of the invention will become apparent from a consideration of the following detailed description taken in connection with the accompanying drawings, wherein, satisfactory embodiments of the invention are shown. However, it is to be understood that the invention is not limited to the details disclosed but includes all such variations and modifications as fall within the spirit of the invention and the scope of the appended claims.

In the drawings:

Fig. 6 is an isometric view showing the various internal parts in relation ready for assembly;

Fig. 7 is an elevational view with parts broken away, showing certain internal parts assembled and partially inserted into the housing;

Fig. 8 is an isometric view of an end closure assembly;

Fig. 9 is a fragmentary sectional view, with the chase and various parts in their proper positions within the housing and illustrating the manner of inserting the contacts at the outer sides of the electrodes and the assembly of the base on the housing;

Fig. 14 is a front elevational view of the chase illustrating the manner in which the same is adapted to receive another size electrode assembly.

Figure 1:
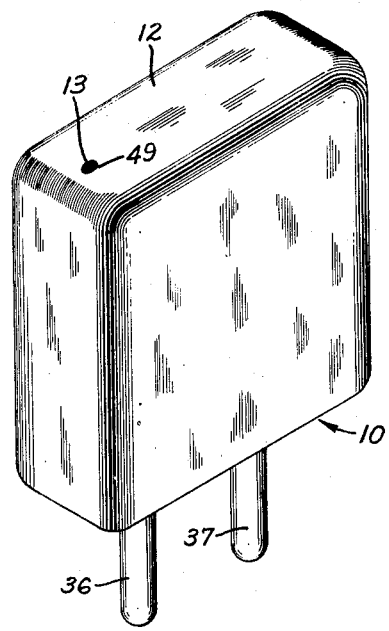
Fig. 1 is an isometric view showing the complete holder of the invention.

Referring in detail to the drawings and at first more particularly to Figs. 1 through 9, at 10 is generally indicated a metal housing. This housing is of a plated ferrous metal or of a non-ferrous metal, as Monel metal, and preferably is a drawn structure whereby it is seamless. Prior to assembly of the completed device, the housing 10 is open at one end as at 11 (see Fig. 9) and the wall 12 of its opposite end is provided with a small opening 13, the purpose of which will be set forth.

Housing 10 is adapted to rather snugly receive an assembly including a hollow chase generally designated 14. This chase is of an insulating material, for example, molded plastic, a molded combination of powdered glass and mica (sold commercially as Mycalex), steatite, or glass, and includes a rear wall 15, an end wall 16, end wall portions 17 and 18, the side walls 19 and 20. Thus the chase is open at its front side, and in addition, has an opening 21 between its end wall sections 17 and 18 and substantially midway between the side walls 19 and 20.

Directly opposite the open front side of the chase, the back wall 15 of the latter is thickened, providing a forwardly projecting pad-like extension 22. The interior of the chase is formed to provide a scalloped effect in that (see particularly Fig. 2) the top and side walls and the bottom wall sections include inwardly extending projections 23, each of which is radiused at its inner end for a limited and tangential engagement with certain parts to be received within the chase.

Such parts include a piezo-electric oscillator plate 24, electrodes 25 and 26 disposed at opposite sides of said plate, and provided with integral raised corner portions 27 on their inner faces. The manner of the formation of these raised corners is immaterial but they may be provided by offsetting forwardly the corners of the electrodes. These electrodes are of approximately the size of the oscillator plate, and when they are forced or clamped against opposite sides of the latter, serve to support it from its corners only, leaving a pre-determined air gap between each electrode and the adjacent main surface of the oscillator plate.

When the parts are assembled in the chase, electrode 26 is disposed toward the pad 22 on the back wall of the chase, oscillator plate 24 is disposed against electrode 26, and electrode 25 is against the outer side of the oscillator plate. Then, an insulating plate 28 of approximately the size of the electrodes is located against the outer side of electrode 25 and a suitable pressure applying means, as, for example, a spring 29, is disposed against the outer side of insulator 28. Here it is noted that the electrodes and oscillator plate are of such size as to fit between and tangentially engage the apices of the projections 23 on the inner surfaces of the chase. After the described parts have been assembled in the chase 14, the assembly is inserted into housing 10, as suggested in Fig. 7, the spring 29 being held flat or substantially so.

After the chase assembly is within the housing a closure assembly is applied and the entire device sealed up with solder. The closure assembly generaly designated 30 includes a hollow metal shell 31, comprising an end wall 32 and a side wall 33, adapted to be received within the open end portion of housing 10. Shell 31 is formed of a plated ferrous metal or of a nonferrous metal, as Monel metal, as in the case of the housing 10. A pair of eyelets 34 and 35 are located one in each of a pair of openings formed in the shell wall 32. These eyelets are formed of a material such as Monel. Substantially centrally located in the eyelets 34 and 35 are contact making prongs 36 and 37 respectively. These prongs are secured within the eyelets and insulated from the latter by insulating rings 38 and 39 respectively. Such rings may be of glass, plastic or Mycalex (which latter comprises a molded combination of powdered glass and mica), molded in place under conditions of high pressure and temperature. The Mycalex has a greater resiliency and elasticity and hence, withstands thermal and mechanical shock better than glass. The molded plastic is better than either glass or Mycalex in the mentioned respect, but has a much higher water, moisture or fluid transmission co-efficient than either glass or Mycalex.

When the insulator rings are of glass, following the molding they are completely annealed to remove strain. In addition to the above, it is pointed out that the material of these eyelets has at least as great a co-efficient of thermal expansion than that of the material of the insulators, whereby the latter have a compression or matching seal within the eyelets when the assembly is cool. Additionally, it is noted that the pins and the eyelets are of a material that will readily oxidize. The oxide formed must be of the type that is wet and dissolved by the glass or the glass in the Mycalex whereby to establish a seal between the rings 39 and the pins and eyelets.

Prongs 36 and 37 have a co-efficient of expansion substantially the same as that of the plastic glass or compound of powdered glass and mica. Within the molded rings 38 and 39 the prongs are provided with annular flanges or shoulders 40 assisting in physically securing the prongs in the rings, and in addition, serving to provide a gas-proof seal between the parts. For the purpose of improving the mechanical bond between the eyelets and insulator rings the eyelets may be internally knurled. The molded sub-assemblies comprising the respective prongs and their eyelets, and the insulator rings are secured in place in that the eyelets are soldered to the shell 31 as at 41. This solder in addition to physically securing the parts together acts to form a gas-tight seal between the eyelets and the shell 31.

Contact members 42 and 43 are attached to the inner ends of the prongs 36 and 37 respectively. Thus the complete closure assembly 30 comprises a shell 31, a pair of eyelets 34 and 35, a pair of prongs 36 and 37, and the pair of anchoring and insulating rings 38 and 39, beyond which project the inner ends of the prongs and to which inner ends are attached the contact members 42 and 43.

Contacts 42 and 43 are of identical construction and each comprises an electrode engaging elongated arm 44, and an offset portion 45, carrying a laterally extending foot portion 46. The contact elements are arranged opposite one another whereby the foot portion 46 of element 43 is attached at 47 to the inner end of prong 37, while the foot portion 46 of element 42 is attached at 47 to the inner end of prong 36. In the closure assembly the distance between the arms 44 of the respective contact members is substantially the distance between the outer faces of the electrodes 25 and 26.

With the chase assembly in housing 10 as above described, and the closure assembly completed, as described immediately above, the arms 44 of the contact members are inserted through the open end of the casing 10 and the opening 21 through the lower end of the chase 14, and enter at the outer sides of the electrodes 25 and 26. From this, it will be understood that the contact arms enter between the outer side of electrode 26 and the inner face of the pad 22, and between the outer side of electrode 25 and the inner face of the insulator 28.

The start of this assembly is suggested in Fig. 9, and from the latter it will be clear that a continued telescopic movement of housing 10 and closure assembly 30 toward one another will result in the entrance of the wall portion 33 of shell 31 into the casing 10. This movement is continued until the parts reach the positions of Figs. 2 and 3 wherein the opposite flange-like portions 45 of the contact members 42 and 43 have their inner edges engaging the lower surfaces of the bottom wall portions 17 and 18 respectively, of chase 14.

With the closure assembly in place, as described, it will be clear that the spring 29 acts to force the contact 42 against the outer side of electrode 25 and to force the outer side of electrode 26 against contact 43. In turn, the last mentioned contact is held against the pad 22 and the electrodes at their corners are held firmly against the oscillator plate 24. Chase 14 effectively insulates contact 43 from the casing 10 and the plate 28 insulates spring 29 from contact 42. Thus with the assistance of the insulating rings 38 and 39 all parts are fully insulated from the metal housing and end closure.

After the parts are assembled the shell 31 is soldered to the casing 10 as at 48. As shown, a small trough is formed between the extreme ends of the walls of the casing 10 and the radius between the end wall 32 and the side wall 33 of shell 31, and this trough is preferably substantially filled with solder. Thus at 48 there is a complete ring of solder. In addition, there is a sweat solder joint all along the wall 33 between the latter and the adjacent wall portions of casing 10. The solder serves to physically connect the closure assembly to casing 10, and in addition, provides a gas-tight seal between these parts. Heat used in the soldering operation serves to cause expansion of the gas or air within the housing and opening 13 is in the nature of a vent permitting easy escape of the expanded air or gas. Thus is prevented any distortion or likelihood of distortion of the parts or the formation of blowholes in the solder, since no substantial pressure is built up within the housing.

After the parts are cool or substantially cool, a solder pellet 49 is used to seal the opening 13. As the parts are cool when pellet 49 is used there will be no vacuum within the holder. The solder 41 about the eyelets 34 and 35, and the solder 48, is preferably, in each instance, applied in the form of a washer, heated after being positioned, whereby to flow in place and secure the parts together and form gas-tight connections between them. However, it is noted that the solder 41 about eyelets 34 and 35 has a higher melting point than the solder used at 48 and 49.

Figure 10:
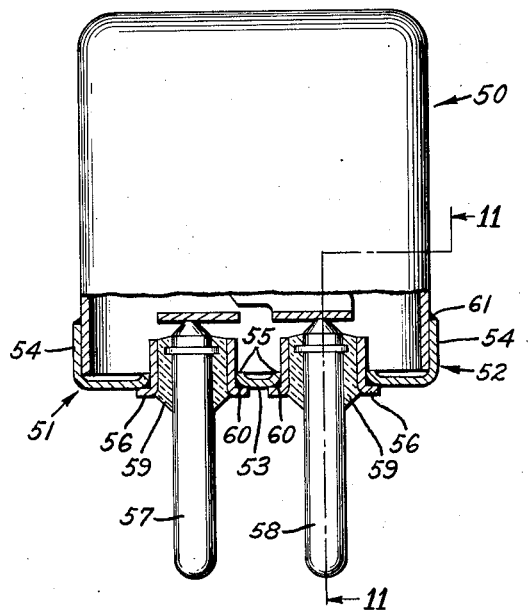
Fig. 10 is an elevational view, with parts broken away as suggested by the line 10—10 of Fig. 11, showing a slightly different structure.
Figure 11:
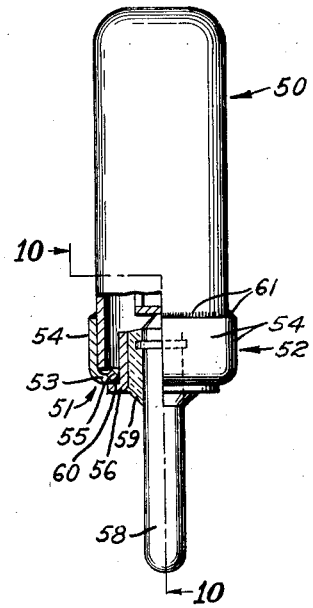
Fig. 11 is a similar view but taken at right angles to Fig. 10, the break being as suggested by the line 11—11 of Fig. 10.

Referring now to Figs. 10 and 11, there is shown a modification including a metal casing generally designated 50, which is the same as or at least similar to the casing 10 first mentioned and described. The open end of casing 50 is closed by an end closure assembly, generally designated 51, and comprising a metal shell of the material of and corresponding to shell 31, including end wall 53 and side walls 54, which latter are adapted to telescopically receive the open end portion of casing 50. Wall 53 of shell 52 is pierced to provide a pair of spaced openings, each surrounded by a slightly inwardly directed flange 55, and these flanges substantially embrace eyelets 56, corresponding with the eyelets 34, and 35, first described.

Glass, a plastic, a mixture of powdered glass and mica, or the like is molded within the eyelets 56 about a pair of prongs 57 and 58 (corresponding with the prongs 36 and 37 first described) forming insulating rings 59, corresponding with the rings 38 and 39 first described. Solder washers 60 serve to unite the eyelets with the flanges 55, to form gas-tight seals between the eyelets and the shell 52. As will be understood, casing 50 contains the chase and other parts, as described in connection with Figs. 1 through 9, and closure assembly 51 includes contact members attached to the inner ends of the prongs 57 and 58.

The modification consists essentially in the formation of the flanges 55 and in the fact that in Figs. 10 and 11 the open end portion of the casing telescopes into the end closure whereas in Figs. 1 through 9 the end closure telescopes into the open end of the casing. A solder washer 61 about the open end of shell 52 serves to unite the same with the casing 50 and a sweat solder joint is formed between the side walls 54 of shell 52 and the adjacent wall portions of casing 50. This casing 50 may be provided with a small vent opening closed by a soldered pellet (not shown) as in the case of the opening 13 and the solder pellet 49 of the figures first described.

Figure 12:
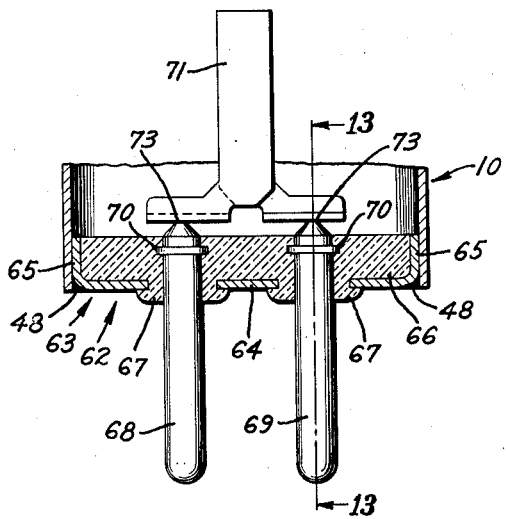
Fig. 12 is a sectional view, showing a further modification of the base assembly, the view being in section as suggested by the line 12—12 of Fig. 13.
Figure 13:
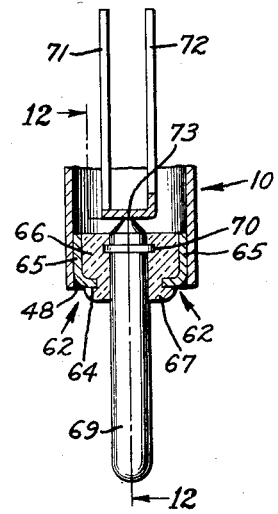
Fig. 13 is a sectional view as along the line 13—13 of Fig. 12.

Referring now to the modifications of Figs. 12 and 13, there is shown only an end closure assembly 62 to be used with any suitable casing, as for example with the casing 10. Assembly 62 comprises the metal shell 63 of the material of and corresponding to shells 31 and 51, including an end wall 64 and side walls 65.

Shell 63 is of a metal having a co-efficient of expansion the same as or slightly greater than that of the body 66, to which the shell is molded, whereby the shell has a compression or matching seal about such body 66 when the parts have cooled. Body 66 is a molded compound of powdered glass and mica (Mycalex) or the like, and includes portions 67 projecting through openings in the shell wall 64 and over-lapping both surfaces of the wall about the edges of such opening, whereby the parts are mechanically united. Additionally, an effective seal is obtained between such parts as they are of readily oxidizable metal as in the case of the eyelets and pins above described.

Prongs 68 and 69 (corresponding with the prongs 36 and 37, 57 and 58) have portions molded into the body 66, and within the body such prongs include annular shoulders 70, assisting in forming a mechanical connection between the prongs and the body and, in addition, functioning to assist in providing a gas-proof seal between the parts. Contact members 71 and 72 are attached as at 73 to the inner ends of the prongs 68 and 69 respectively, and such contact members correspond with and are of the construction of the contact members 42 and 43 described above.

In lieu of the shoulders or flanges 70, the prongs 68 and 69 may be knurled within portions to which the glass or plastic body is molded and, for the purpose of a mechanical connection and a seal, the prongs might be grooved to provide shoulders. These described variations of the knurling or grooving of the prongs when they are to be molded in a plastic or glass may be applied to the prongs of the Figs. 1 through 11 if desired. However, where the insulating rings or the insulating body 66 are of a molded compound of powdered glass and mica the shouldered or flanged type of prongs are the only ones to mold satisfactorily.

Figure 2:
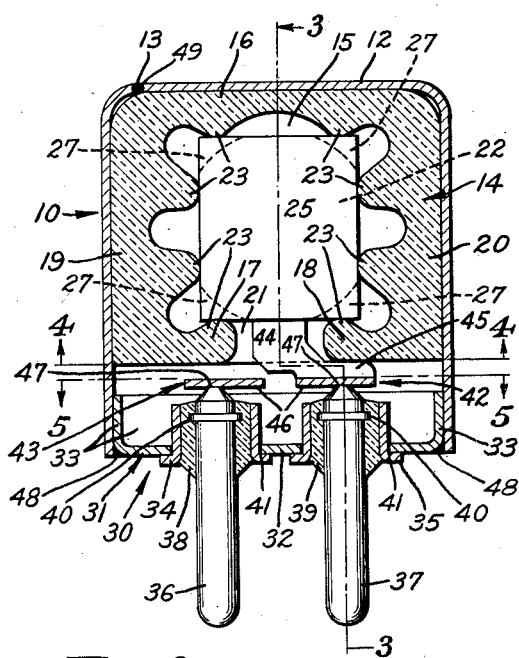
Fig. 2 is a longitudinal sectional view through the entire device, taken as along the plane of the line 2—2 of Fig. 3.
Figure 3:
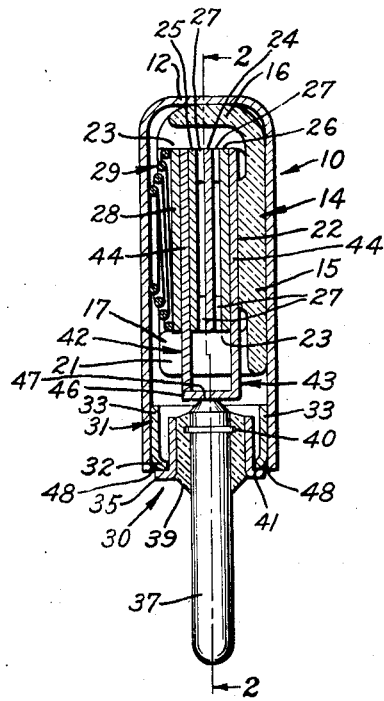
Fig. 3 is a longitudinal sectional view through the device as along the plane of the line 3—3 of Fig. 2.
Figure 4:
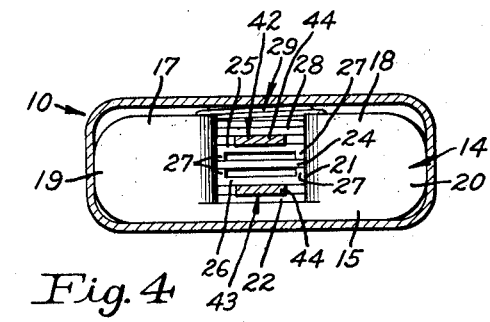
Fig. 4 is a transverse sectional view, taken as along the plane of the line 4—4 of Fig. 2.
Figure 5:
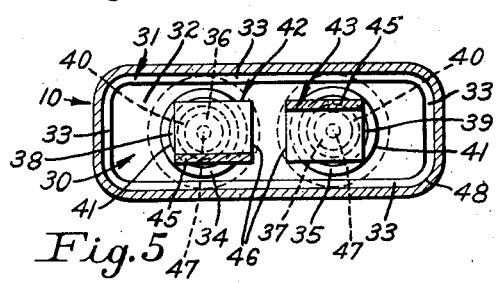
Fig. 5 is a transverse sectional view taken as along the plane of the line 5—5 of Fig. 2.

In Fig. 2 the chase is shown receiving an electrode assembly having a greater length than width. However, this chase is also adapted to receive a different size, as a square, electrode assembly. Thus in Fig. 14 the chase 74 (corresponding with chase 14 of Fig. 2) is shown receiving a square electrode assembly 75. The assembly of Fig. 2 may measure .5″ by .6″ while the assembly 75 may measure .5″ by .5″. To fit the latter assembly in the chase the assembly is rotated through approximately 45 degrees and the corners of the assembly are receiving in a pair of the recesses 76 provided by the scalloped inner edge construction of the chase. This is a real advantage as the present chase is thus adapted for receiving different sizes and shapes of electrode assemblies.

Having thus set forth the nature of my invention, what I claim is:

1. A piezo crystal device comprising metal casing having an open end, a hollow chase of insulating material within said casing and open at one side and having an opening through an end facing toward the open end of said casing, a crystal assembly in said chase and including a crystal, electrodes at each side of said crystal, an insulator over the electrode toward the open side of the chase, and a spring means bearing against said insulator and the inner surface of the side wall of said casing and constantly urging said crystal assembly toward the rear wall of said chase, a pair of contact elements including arm portions at the outer sides of the respective electrodes, a metallic end closure closing the open end of said housing, a pair of contact prongs carried by extending through and insulated from said metallic end closure, said contact elements attached to the inner ends of the respective prongs, means providing a gas-tight seal between said prongs and said metallic end closure, and said metallic end closure soldered to the open end portion of said casing.

2. A chase for use in a piezo crystal holder, said chase comprising a one-piece hollow body of insulating material open through its front side and having a relatively wide opening through the mid portion of one edge and said front side and leading to its interior intermediate a pair of its opposite edges.

3. A chase as in claim 2 wherein the inner surface of each edge of said hollow body includes a plurality of spaced inwardly extending projection each of a thickness equal to the depth of said hollow body.

4. A piezo crystal device comprising a metal casing having an open end, a hollow chase of insulating material within said casing and open at one side and having an opening through an end facing toward the open end of said casing, a crystal assembly in said chase and including a crystal and electrodes at each side of said crystal, said assembly arranged in said chase with one of said electrodes toward the open side of the chase and the other toward the closed side thereof, an insulator over the electrode toward the open side of the chase, a pair of contact elements including arm portions at the outer sides of the respective electrodes and in engagement with the latter, a metallic end closure closing the open end of said casing, a pair of contact prongs carried by and extending through and insulated from said metallic end closure, said contact elements attached to the inner ends of the respective prongs, means providing a gas-tight seal between said prongs and said metallic end closure, and said metallic end closure sealed to the open end portion of said casing.

JAMES B. ADAMS, JR.

REFERENCES CITED

The following references are of record in the file of this patent:

UNITED STATES PATENTS

| Number | Name | Date |
|---|---|---|
| 1,619,125 | Hough | Mar. 1, 1927 |
| 1,619,854 | Crossley | Mar. 8, 1927 |
| 1,898,599 | Schroter | Feb. 12, 1933 |
| 1,990,822 | Goldstine | Feb. 12, 1935 |
| 2,070,732 | Holden | Feb. 16, 1937 |
| 2,138,036 | Kunze | Nov. 29, 1938 |
| 2,155,035 | Bieling | Apr. 18, 1939 |
| 2,320,131 | Hight | May 25, 1943 |
| 2,384,757 | Kuenstler | Sept. 11, 1945 |
| 2,399,908 | Bokovoy | May 7, 1946 |
| 2,404,445 | Kuenstler | July 23, 1946 |
| 2,409,607 | Bach | Oct. 22, 1946 |
| 2,412,030 | Baldwin | Dec. 3, 1946 |
| 2,429,826 | Kuenstler | Oct. 28, 1947 |
| 2,434,265 | Fruth | Jan. 13, 1948 |